(12) United States Patent
Ding

(10) Patent No.: US 10,473,454 B1
(45) Date of Patent: Nov. 12, 2019

(54) IMAGING-BASED HEIGHT MEASUREMENT BASED ON KNOWN GEOMETRIC INFORMATION

(71) Applicant: KLA-Tencor Corporation, Milpitas, CA (US)

(72) Inventor: Yiwu Ding, Danville, CA (US)

(73) Assignee: KLA-Tencor Corporation, Milpitas, CA (US)

(*) Notice: Subject to any disclaimer, the term of this patent is extended or adjusted under 35 U.S.C. 154(b) by 75 days.

(21) Appl. No.: 15/861,894

(22) Filed: Jan. 4, 2018

Related U.S. Application Data

(60) Provisional application No. 62/443,504, filed on Jan. 6, 2017.

(51) Int. Cl.
  *G06K 9/00* (2006.01)
  *G01B 11/06* (2006.01)
  *G06T 7/55* (2017.01)

(52) U.S. Cl.
  CPC ............ *G01B 11/0608* (2013.01); *G06T 7/55* (2017.01)

(58) Field of Classification Search
  CPC ........... G06T 7/55; G06T 7/0004; G06T 7/44; G06T 7/60; G06T 7/001; G06T 2200/04; G06T 2207/30148; G06T 2207/10028; G06T 2207/30152; G06T 2207/10012; G06K 9/00201; Y10S 977/852; G01B 11/0608; G01B 11/25; G01B 11/00; G01B 11/2527; G01B 11/2545; G01B 11/303; G01B 11/245; G01B 11/2433; G01B 11/002; G01B 11/306; G01B 21/28; G01B 21/30; H04N 13/239; H04N 2013/0081; B82Y 35/00; G01N 21/8806; G01N 21/9501; G02B 21/0016; G02B 21/367

See application file for complete search history.

(56) References Cited

U.S. PATENT DOCUMENTS

| | | | |
|---|---|---|---|
| 9,494,529 B1* | 11/2016 | Fresquet | G02B 21/0032 |
| 2007/0097381 A1* | 5/2007 | Tobiason | G01B 11/25 356/604 |
| 2008/0100850 A1* | 5/2008 | Watson | G01B 11/0608 356/601 |
| 2008/0135750 A1* | 6/2008 | Kley | B82Y 35/00 250/306 |

(Continued)

*Primary Examiner* — Jose L Couso
(74) *Attorney, Agent, or Firm* — Suiter Swantz pc llo

(57) ABSTRACT

A height mapping system includes a controller configured to generate a height map of a region of interest of a sample with a first optical metrology system having a first numerical aperture, receive images of features having known three-dimensional shapes at selected image plane locations from a second optical metrology system having a second numerical aperture larger than the first numerical aperture, calculate distances between the imaging plane locations and peaks of the features based on in-focus portions of the images and the known three-dimensional shapes, determine distances between the imaging plane locations and a surface of the sample for the features based on the height map, and determine heights of the features by combining the distances between the imaging plane locations and peaks of the features with the distances between the imaging plane locations and the surface of the sample for the one or more features.

39 Claims, 10 Drawing Sheets

(56) References Cited

U.S. PATENT DOCUMENTS

| | | | | |
|---|---|---|---|---|
| 2008/0204697 A1* | 8/2008 | Domenicali | ............ | G01C 11/12 |
| | | | | 356/2 |
| 2012/0033066 A1* | 2/2012 | Wieser | ................ | G01B 11/0608 |
| | | | | 348/87 |
| 2013/0033595 A1* | 2/2013 | Adelson | ................ | A61B 5/0077 |
| | | | | 348/92 |
| 2015/0136949 A1* | 5/2015 | De Nooij | ............ | G02B 21/0016 |
| | | | | 250/208.1 |
| 2015/0168128 A1* | 6/2015 | Xiao | ................. | G01B 11/0608 |
| | | | | 356/496 |
| 2015/0192769 A1* | 7/2015 | Dresel | ................. | G02B 21/367 |
| | | | | 356/450 |
| 2016/0061596 A1* | 3/2016 | Suhring | ............... | G01B 11/303 |
| | | | | 356/600 |
| 2018/0023947 A1* | 1/2018 | Meng | .................... | G01B 11/25 |
| | | | | 348/46 |

* cited by examiner

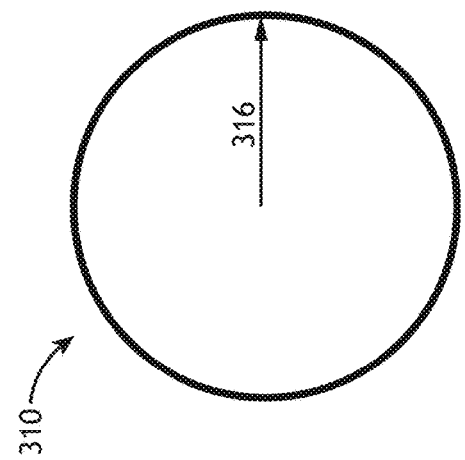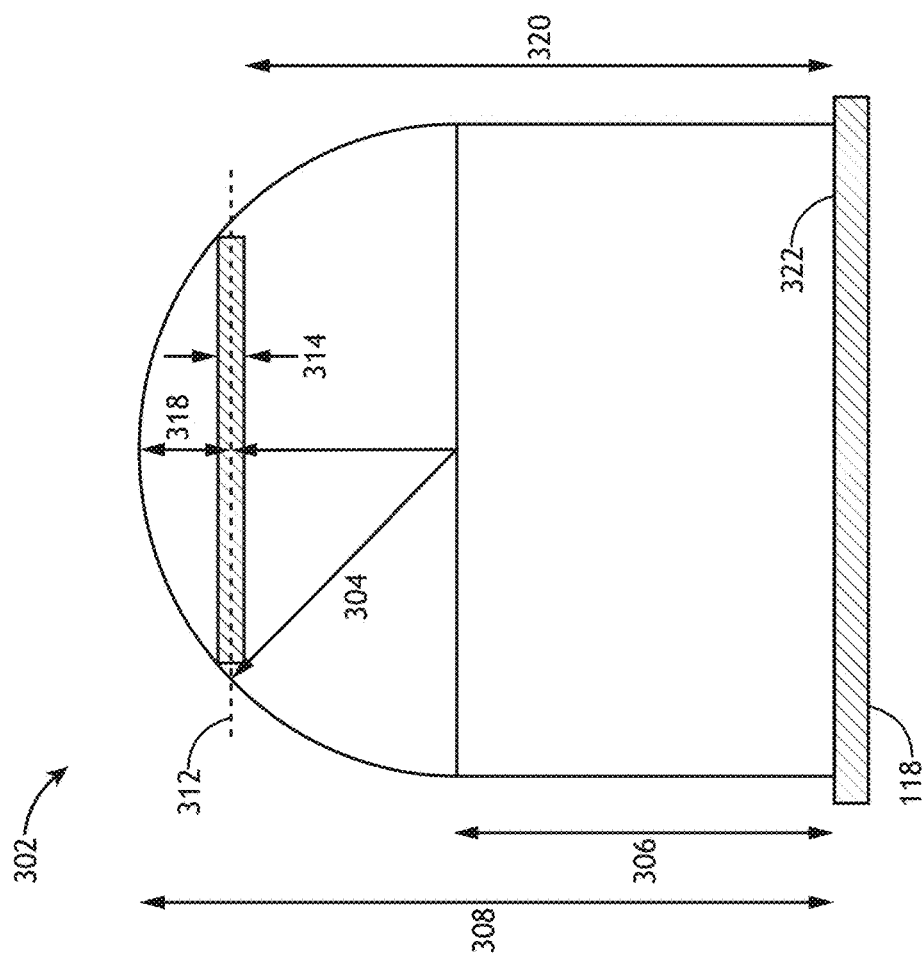

IMAGING-BASED HEIGHT MEASUREMENT BASED ON KNOWN GEOMETRIC INFORMATION

CROSS-REFERENCE TO RELATED APPLICATION

The present application claims the benefit under 35 U.S.C. § 119(e) of U.S. Provisional Application Ser. No. 62/443,504, filed Jan. 6, 2017, entitled IMAGING BASED HEIGHT MEASUREMENT FOR SEMICONDUCTOR INSPECTION AND METROLOGY, naming Yiwu Ding as inventor, which is incorporated herein by reference in the entirety.

TECHNICAL FIELD

The present disclosure relates generally to the field of image-based metrology and, more particularly, to image-based measurements of surface height.

BACKGROUND

Semiconductor device layers such as, but not limited to, back end of line (BEOL) layers may include three-dimensional features such as, but not limited to, surface bumps fabricated on a surface (e.g., a substrate or previously fabricated layers). The precise heights of the three-dimensional features may be critical for the fabrication of subsequent layers. However, the throughput of height mapping tools having a sufficient resolution to measure the heights of the three-dimensional features is typically low, which in turn negatively impacts the throughput of the entire fabrication process. Therefore, it may be desirable to provide systems and methods to cure the defects identified above.

SUMMARY

A system is disclosed, in accordance with one or more illustrative embodiments of the present disclosure. In one illustrative embodiment, the system includes a controller including one or more processors. In another illustrative embodiment, the controller is configured to generate a height map of a region of interest of a sample with a first optical metrology system having a first numerical aperture. In another illustrative embodiment, the controller is configured to receive images of one or more features within the region of interest at selected image plane locations from a second optical metrology system having a second numerical aperture larger than the first numerical aperture. In another illustrative embodiment, a depth of field of the second optical metrology system is smaller than a height of at least one feature of the one or more features. In another illustrative embodiment, the one or more features have known three-dimensional shapes. In another illustrative embodiment, the controller is configured to calculate distances between the imaging plane locations and peaks of the one or more features based on in-focus portions of the images of the one or more features and the known three-dimensional shapes of the one or more features. In another illustrative embodiment, the controller is configured to determine distances between the imaging plane locations and a surface of the sample for the one or more features based on the height map. In another illustrative embodiment, the controller is configured to determine heights of the one or more features by combining the distances between the imaging plane locations and peaks of the one or more features with the distances between the imaging plane locations and the surface of the sample for the one or more features.

A system is disclosed, in accordance with one or more illustrative embodiments of the present disclosure. In one illustrative embodiment, the system includes a first optical metrology system configured to generate a height map of a region of interest of a sample including one or more features having known three-dimensional shapes, wherein the first optical metrology system has a first numerical aperture. In another illustrative embodiment, the system includes a second optical metrology system configured to generate images of the one or more features at selected image plane locations. In another illustrative embodiment, the second optical metrology system has a second numerical aperture larger than the first numerical aperture. In another illustrative embodiment, the depth of field of the second optical metrology system is smaller than a height of at least one feature of the one or more features. In another illustrative embodiment, the system includes a controller including one or more processors and communicatively coupled to the first optical metrology system and the second optical metrology system. In another illustrative embodiment, the controller is configured to calculate distances between the imaging planes and peaks of the one or more features based on in-focus portions of the images of the one or more features and the known three-dimensional shapes of the one or more features. In another illustrative embodiment, the controller is configured to determine distances between the imaging plane locations and a surface of the sample for the one or more features based on the height map. In another illustrative embodiment, the controller is configured to determine heights of the one or more features by combining the distances between the imaging plane locations and peaks of the one or more features with the distances between the imaging plane locations and the surface of the sample for the one or more features.

A method is disclosed, in accordance with one or more illustrative embodiments of the present disclosure. In one illustrative embodiment, the method includes generating a height map of a region of interest of a sample with a first optical metrology system having a first numerical aperture. In another illustrative embodiment, the method includes capturing images of one or more features within the region of interest at selected imaging plane locations with a second optical metrology system having a second numerical aperture larger than the first numerical aperture. In another illustrative embodiment, a depth of field of the second optical metrology system is smaller than a height of at least one feature of the one or more features. In another illustrative embodiment, the one or more features have known three-dimensional shapes. In another illustrative embodiment, the method includes calculating distances between the imaging plane locations and peaks of the one or more features based on in-focus portions of the images of the one or more features and the known three-dimensional shapes of the one or more features. In another illustrative embodiment, the method includes determining distances between the imaging plane locations and a surface of the sample for the one or more features based on the height map. In another illustrative embodiment, the method includes determining heights of the one or more features by combining the distances between the imaging plane locations and peaks of the one or more features with the distances between the imaging plane locations and the surface of the sample for the one or more features.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and, together with the general description, serve to explain the principles of the invention.

BRIEF DESCRIPTION OF DRAWINGS

The numerous advantages of the disclosure may be better understood by those skilled in the art by reference to the accompanying figures in which:

FIG. 3A is a conceptual side view of a feature including a spherical dome on a cylindrical pillar, in accordance with one or more embodiments of the present disclosure.

FIG. 3B is a cross-section image of a feature at an imaging plane, in accordance with one or more embodiments of the present disclosure.

DETAILED DESCRIPTION

Figure 1A:
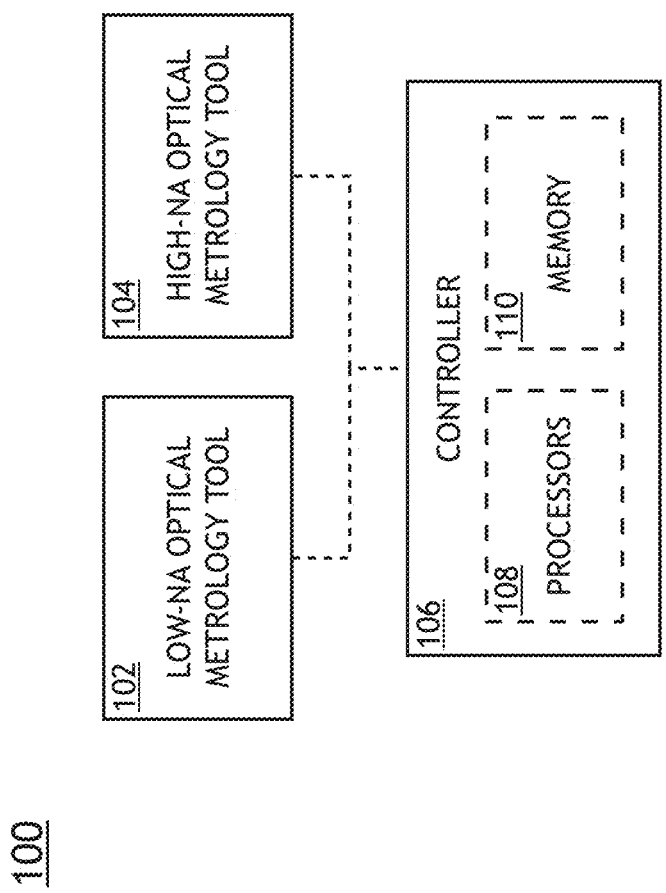
FIG. 1A is a conceptual view illustrating a surface height metrology system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to height measurements of features on a sample having known three-dimensional shapes based on imaging the features with a high numerical aperture (NA) optical metrology system, and using the in-focus portions of the features to calculate the structure height based on the known three-dimensional shapes.

Semiconductor fabrication typically involves fabricating features on a sample with highly-controlled three-dimensional shapes. For example, back end of line (BEOL) processing steps may include fabricating a series of features (e.g., bumps) on a sample to interface between interconnected layers. It may thus be desirable to measure the heights of the fabricated features across a sample (or a region of interest (ROI)) of the sample to properly fabricate subsequent layers. Further, it may be the case that the height of the sample surface on which the features are fabricated may vary across the sample due to imperfections and/or previously-fabricated features.

As used throughout the present disclosure, the term "sample" generally refers to a substrate formed of a semiconductor or non-semiconductor material (e.g., a wafer, or the like). For example, a semiconductor or non-semiconductor material may include, but is not limited to, monocrystalline silicon, gallium arsenide, or indium phosphide. A sample may include one or more layers. For example, such layers may include, but are not limited to, a resist, a dielectric material, a conductive material, and a semiconductive material. Many different types of such layers are known in the art, and the term sample as used herein is intended to encompass a sample on which all types of such layers may be formed. One or more layers formed on a sample may be patterned or unpatterned. For example, a sample may include a plurality of dies, each having repeatable patterned features. Formation and processing of such layers of material may ultimately result in completed devices. Further, for the purposes of the present disclosure, the term sample and wafer should be interpreted as interchangeable.

It is recognized herein that the NA of an optical system may impact the measurement volume and thus the throughput of the optical system. For example, increasing the NA may simultaneously decrease the field of view (e.g., the lateral area of the sample interrogated by the system) and the depth of field (e.g., the longitudinal distance above and below an imaging plane that is effectively in focus). In this regard, increasing the NA may increase the magnification and the resolution of an optical measurement at the expense of a reduced measurement area. Further, increasing the NA may decrease the throughput of the optical system by increasing the number of measurement sites required to characterize a ROI of a sample.

Additional embodiments of the present disclosure are directed to determining the heights of fabricated features by generating a height map of a ROI with a low-NA optical metrology system as well as capturing images of the features with a high-NA optical metrology system. In this regard, the low-NA optical metrology system may provide a high-throughput measurement of the surface profile of the substrate on which features are fabricated and the high-NA optical metrology system may provide targeted high-resolution measurements of the features of interest. Accordingly, accuracy and throughput may be balanced. For the purposes of the present disclosure, the terms "low-NA optical metrology system" and "high-NA optical metrology system" merely indicate that the low-NA optical metrology system has a lower numerical aperture than the high-NA optical metrology system. Both the low-NA and the high-NA optical metrology systems may have any value of numerical aperture.

Additional embodiments of the present disclosure are directed to selecting the NA of the high-NA optical metrology system such that the depth of field is smaller than the height of each feature. Further, the imaging height of the high-NA optical metrology system (e.g., the distance between the imaging plane and the sample surface) may be selected for each feature such that at least a portion of the feature is in focus. In this regard, only a portion of each feature may be in focus in a captured image and the captured image may represent a slice of the feature. For example, the imaging height may be selected based at least in part on the height map generated by the low-NA optical metrology system. Further, fabricated features may be formed from any number of materials and may be transparent or opaque to the high-NA optical metrology system. For example, an entire slice of a transparent feature may be in focus in an image. By way of another example, a perimeter of a slice of an opaque feature may be in focus in an image.

Additional embodiments of the present disclosure are directed to determining feature height as a combination of a distance between the imaging plane of the high-NA optical metrology system and the peak of the feature, and a distance between the imaging plane and the substrate. The distance between the imaging plane and the feature peak may be calculated based on the known geometry of the feature and geometric information of the in-focus portion of the image. For example, an in-focus portion of a high-NA image of a spherical dome may include a circle (e.g., a slice of the dome taken parallel to the substrate). The distance between the imaging plane and the peak of the spherical dome may then be calculated based on the known dome radius and the radius of the in-focus slice of the dome. Similarly, an in-focus portion of an image of a high-NA image of a pyramid with a four-sided base may include a square such that the distance between the imaging plane and the peak of the pyramid may be calculated based on the size of the measured square and the known sizes of the pyramid base as well as the apex height. In this regard, the distance between the imaging plane and a feature peak may be generated for any feature with a known arbitrary shape.

Further, the distance between the imaging plane and the substrate may be determined for each feature based on the height map from the low-NA optical metrology system. Thus, the total feature height for each feature may be calculated based on measurements from both the low-NA optical metrology system and the high-NA optical metrology system coupled with the known feature geometry.

FIG. 1A is a conceptual view illustrating a surface height metrology system 100, in accordance with one or more embodiments of the present disclosure.

In one embodiment, the surface height metrology system 100 includes a low-NA optical metrology tool 102 and a high-NA optical metrology tool 104. As described previously herein, the terms low-NA and high-NA merely indicate that the low-NA optical metrology tool 102 has a lower NA than the high-NA optical metrology tool 104. However, no additional limitations are implied by the terms. The low-NA optical metrology tool 102 and the high-NA optical metrology tool 104 may have any values of numerical aperture provided that the low-NA optical metrology tool 102 has a lower NA than the high-NA optical metrology tool 104. In this regard, the low-NA optical metrology tool 102 may have a larger field of view and/or a larger depth of field than the high-NA optical metrology tool 104.

In another embodiment, the low-NA optical metrology tool 102 is configured to provide a height map of the surface of a sample within a region of interest. In this regard, the low-NA optical metrology tool 102 may characterize the portions of the surface of the sample between fabricated features at a selected accuracy. Further, the low-NA optical metrology tool 102 need not characterize the height of the fabricated features or may characterize the height of the fabricated features with a relatively low accuracy. For example, the NA of the low-NA optical metrology tool 102 may be selected based on expected or known deviations of the surface of the sample between fabricated features with known three-dimensional shapes. In one instance, the NA of the low-NA optical metrology tool 102 may be selected such that the depth of field is greater than the deviations of the surface of the sample between the fabricated features. Accordingly, the low-NA optical metrology tool 102 may characterize the sample at a fixed height at which the surface of the sample between the fabricated features is in focus at all points within the region of interest. In another instance, the NA of the low-NA optical metrology tool 102 may be selected to provide a height map with a desired resolution and may require measurements at multiple sample heights.

In another embodiment, the high-NA optical metrology tool 104 is configured to provide high-resolution images of the fabricated features having known three-dimensional shapes with a depth of field smaller than the feature height. In this regard, only a portion of the features will be in focus in captured images. Further, the geometry of the in-focus portion of the features combined with the height map from the low-NA optical metrology tool 102 may be sufficient to determine the heights of the features within the region of interest.

In another embodiment, the surface height metrology system 100 includes a controller 106 communicatively coupled to the low-NA optical metrology tool 102 and the high-NA optical metrology tool 104. In another embodiment, the controller 106 includes one or more processors 108. For example, the one or more processors 108 may be configured to execute a set of program instructions maintained in a memory device 110, or memory. In this regard, the one or more processors 108 of controller 106 may execute any of the various process steps described throughout the present disclosure. For example, the controller 106 may be configured to receive data including, but not limited to, height map data or images from the low-NA optical metrology tool 102 and the high-NA optical metrology tool 104. Additionally, the controller 106 may be configured to determine heights of fabricated features based on the data received by the low-NA optical metrology tool 102 and the high-NA optical metrology tool 104.

The one or more processors 108 of a controller 106 may include any processing element known in the art. In this sense, the one or more processors 108 may include any microprocessor-type device configured to execute algorithms and/or instructions. In one embodiment, the one or more processors 108 may consist of a desktop computer, mainframe computer system, workstation, image computer, parallel processor, or any other computer system (e.g., networked computer) configured to execute a program configured to operate the surface height metrology system 100, as described throughout the present disclosure. It is further recognized that the term "processor" may be broadly defined to encompass any device having one or more processing elements, which execute program instructions from a non-transitory memory device 110.

The memory device 110 may include any storage medium known in the art suitable for storing program instructions executable by the associated one or more processors 108. For example, the memory device 110 may include a non-transitory memory medium. By way of another example, the memory device 110 may include, but is not limited to, a read-only memory, a random access memory, a magnetic or optical memory device (e.g., disk), a magnetic tape, a solid state drive and the like. It is further noted that the memory device 110 may be housed in a common controller housing with the one or more processors 108. In one embodiment, the memory device 110 may be located remotely with respect to the physical location of the one or more processors 108 and controller 106. For instance, the one or more processors 108 of controller 106 may access a remote memory (e.g., server), accessible through a network (e.g., internet, intranet and the like). Therefore, the above description should not be interpreted as a limitation on the present invention but merely an illustration.

Figure 1B:
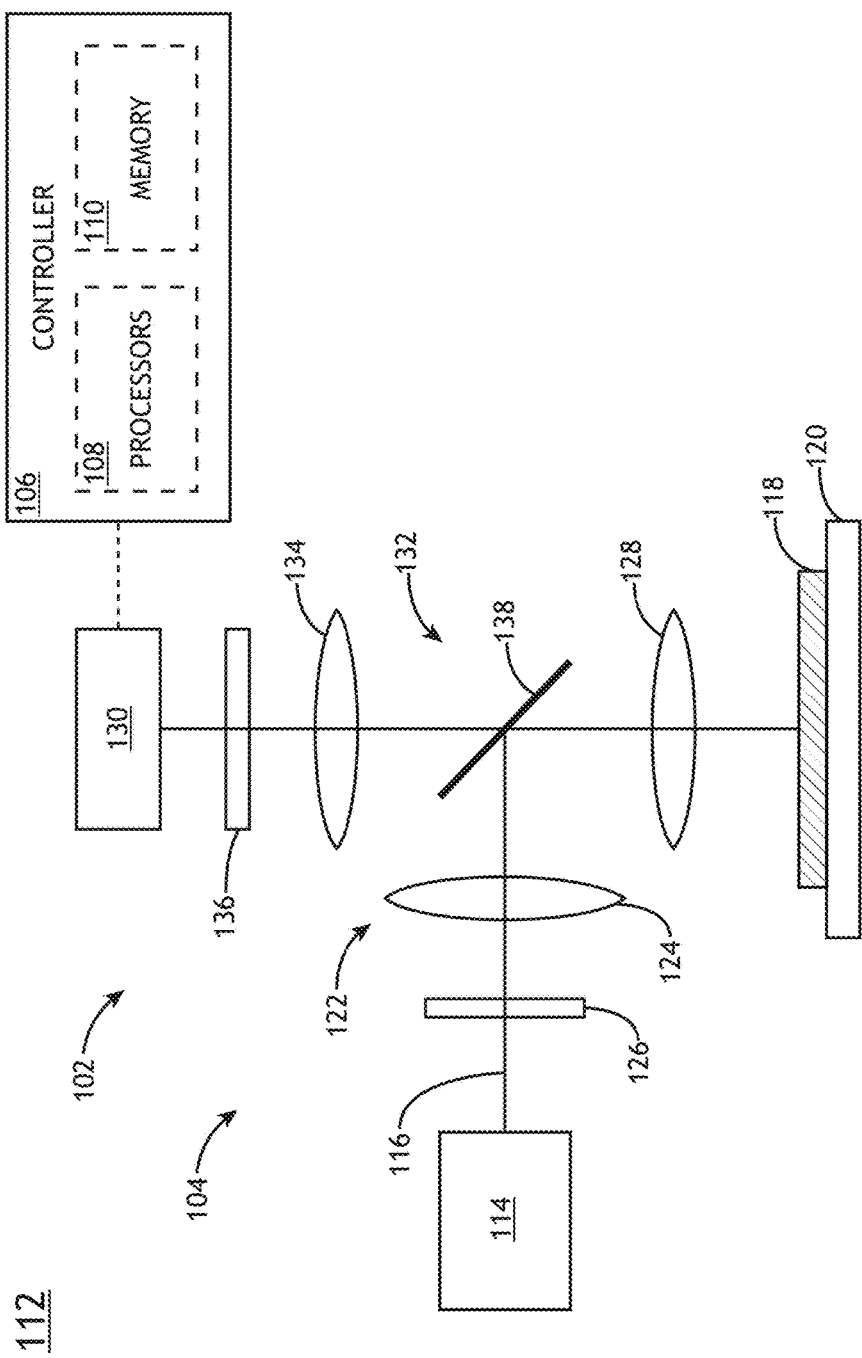
FIG. 1B is a conceptual view illustrating an optical metrology tool suitable for use as a low-NA optical metrology tool and/or a high-NA optical metrology tool, in accordance with one or more embodiments of the present disclosure.

FIG. 1B is a conceptual view illustrating an optical metrology tool 112 suitable for use as the low-NA optical metrology tool 102 and/or the high-NA optical metrology tool 104, in accordance with one or more embodiments of the present disclosure. In one embodiment, the optical metrology tool 112 includes an illumination source 114 to generate an illumination beam 116. Further, the illumination beam 116 may be any type of illumination beam known in the art suitable for metrology. For example, the illumination beam 116 may include a beam of electromagnetic radiation having a selected spectrum including, but not limited to, X-ray wavelengths, ultraviolet (UV) wavelengths, visible wavelengths, or infrared (IR) wavelengths. Further, the illumination beam 116 may have any selected degree of spatial or temporal coherence. For instance, the illumination source 114 may include a laser source suitable for generating a illumination beam 116 having a narrow bandwidth. In another instance, the illumination source 114 may produce an incoherent illumination beam 116 having a broad spectrum. By way of another example, the illumination beam 116 may include particle beam such as, but not limited to, an electron beam, an ion beam, or a beam of neutral particles.

In another embodiment, the illumination source 114 directs the illumination beam 116 to a sample 118 disposed on a sample stage 120 via an illumination pathway 122. The illumination pathway 122 may include one or more illumination pathway lenses 124 or additional illumination pathway components 126 suitable for modifying and/or conditioning the illumination beam 116. For example, the one or more illumination pathway components 126 may include, but are not limited to, one or more polarizers, one or more filters, one or more beam splitters, one or more diffusers, one or more homogenizers, one or more apodizers, one or more phase plates, or one or more beam shapers. In another embodiment, the optical metrology tool 112 includes an objective lens 128 to focus the illumination beam 116 onto the sample 118.

In another embodiment, the optical metrology tool 112 includes a detector 130 configured to capture radiation emanating from the sample 118 through a collection pathway 132. The collection pathway 132 may include one or more collection pathway lenses 134 and/or additional collection pathway components 136 suitable for capturing and/or modifying the radiation emanating from the sample 118 including, but not limited to, one or more lenses, one or more filters, one or more polarizers, one or more apertures, one or more phase plates, or one or more beam blocks. For example, the detector 130 may receive an image of the sample 118 provided by elements in the collection pathway 132 (e.g., the objective lens 128, collection pathway lenses 134, or the like). By way of another example, a detector 130 may receive radiation reflected or scattered (e.g., via specular reflection, diffuse reflection, and the like) from the sample 118. By way of another example, a detector 130 may receive radiation generated by the sample 118 (e.g., luminescence associated with absorption of the illumination beam 116, or the like). By way of another example, a detector 130 may receive one or more diffracted orders of radiation from the sample 118 (e.g., 0-order diffraction, ±1 order diffraction, ±2 order diffraction, and the like).

The detector 130 may include any type of optical detector known in the art suitable for measuring illumination received from the sample 118. For example, a detector 130 may include, but is not limited to, a CCD detector, a TDI detector, a photomultiplier tube (PMT), an avalanche photodiode (APD), or the like. In another embodiment, a detector 130 may include a spectroscopic detector suitable for identifying wavelengths of radiation emanating from the sample 118. In another embodiment, the optical metrology tool 112 may include multiple detectors 130 to facilitate multiple metrology measurements by the optical metrology tool 112.

The optical metrology tool 112 may operate in static or scanning modes. For example, in a static mode, the detector 130 may receive an image of a portion of the sample 118 provided by elements in the collection pathway 132 (e.g., the objective lens 128, collection pathway lenses 134, or the like) for each measurement. In this regard, the size of the image is governed by the field of view of the optical metrology tool 112 (e.g., by the field of view of the objective lens 128). The optical metrology tool 112 may then generate a composite image of a larger region of interest by stitching together multiple images captured at different locations. By way of another example, in a scanning mode, the sample 118 may be scanned through the field of view of the objective lens 128. Accordingly, an image of a region of interest of the sample 118 may be generated by correlating the sample location with radiation received by the detector 130.

The optical metrology tool 112 may operate in any imaging mode known in the art such as, but not limited to, brightfield, darkfield, or phase contrast imaging modes. Accordingly, the optical metrology tool 112 may include components (e.g., illumination pathway components 126 and/or collection pathway components 136) to manipulate the incident illumination and/or the radiation from the sample 118 to provide a selected image.

In another embodiment, as illustrated in FIG. 1B, the optical metrology tool 112 may include a beamsplitter 138 oriented such that the objective lens 128 may simultaneously direct the illumination beam 116 to the sample 118 and collect radiation emanating from the sample 118. In this regard, the optical metrology tool 112 may be configured in an epi-illumination mode.

As described previously herein, both the low-NA optical metrology tool 102 and the high-NA optical metrology tool 104 may be configured as an optical metrology tool 112 illustrated in FIG. 1B. For example, the low-NA optical metrology tool 102 may include one or more components of the optical metrology tool 112 illustrated in FIG. 1B configured to generate a height map of the surface of the sample 118 between fabricated features. By way of another example, the high-NA optical metrology tool 104 may include one or more components of the illumination pathway components 126 illustrated in FIG. 1B configured to generate images of the fabricated features with a depth of field smaller than the feature height.

Further, the low-NA optical metrology tool 102 and the high-NA optical metrology tool 104 may be configured as separate optical systems or as different configurations of a common optical system. In one embodiment, the low-NA optical metrology tool 102 and the high-NA optical metrology tool 104 are configured as separate systems such that the two systems do not share components (e.g., the illumination source 114, detectors 130, or the like). In another embodiment, the low-NA optical metrology tool 102 and the high-NA optical metrology tool 104 represent different configurations of a common optical metrology system (e.g., illustrated in FIG. 1B). A common optical metrology system may include one or more configurable and/or swappable components (e.g., the illumination source 114, the objective lens 128, or the like) such that the common optical metrology system may be configured to operate as the low-NA optical metrology tool 102 and the high-NA optical metrology tool 104. For example, the common optical metrology system may include, but is not required to include, a parfocal optical system in which different objectives (e.g., objective lenses having different NAs) may be interchanged without substantially affecting the location of the imaging plane.

The low-NA optical metrology tool 102 may be configured as any type of optical surface profile tool known in the art suitable for generating a height map of the surface of the sample 118 between features. In this regard, the components of the low-NA optical metrology tool 102 may be configured to provide sufficient data to the controller 106 to generate a height map of a region of interest of the sample 118. In one embodiment, the low-NA optical metrology tool 102 includes multiple detectors at known positions suitable for determining height information based on triangulation. In another embodiment, the low-NA optical metrology tool 102 includes an interferometric surface profile tool. In this regard, height information of the sample 118 surface suitable for the height map may be extracted from interference fringes associated with the illumination beam 116 incident on the sample 118 and a reference flat. For example, a narrowband illumination beam 116 may generate interference fringes that may be unwrapped using a phase unwrapping technique to generate the height map. By way of another example, a broadband (e.g., white light) illumination beam 116 may provide fringes only when path lengths of illumination incident on the sample 118 and illumination incident on the reference flat are the same. Accordingly, height information may be generated by longitudinally translating the sample 118 along the optical axis of the objective lens 128 (e.g., using the sample stage 120) and determining the height of sample 118 that generates fringes. It is to be understood, however, that the above examples are provided solely for illustrative purposes and should not be interpreted as limiting. It is recognized herein that the technique for generating a height map may depend on any particular application and on the particulars of a given sample. For example, for a sample 118 having a relatively smooth surface between fabrication features, a narrowband interference technique may provide high-throughput height map data with a high accuracy. By way of another example, for a sample 118 having densely packed features and/or relatively large height variations across the region of interest, a triangulation technique may provide less noise than an interferometric technique in which an interference pattern may be difficult to interpret.

The high-NA optical metrology tool 104 may be configured as any type of imaging system known in the art suitable for generating images of features having known three-dimensional shapes with a depth of field less than the feature height. For example, the high-NA optical metrology tool 104 may be configured as a brightfield imaging system. In this regard, images of the features may be formed from radiation from the sample 118 entering the objective lens 128 at all angles within the NA. By way of another example, the high-NA optical metrology tool 104 may be configured as a darkfield imaging system. In this regard, images of the features may be formed from scattered radiation. For instance, the illumination pathway 122 may include an aperture to provide annular illumination such that the illumination beam 116 is incident on the sample 118 at an angle. A darkfield image may then be generated based on illumination captured by the objective lens 128 at angles different than the illumination angles. In another instance, the high-NA optical metrology tool 104 may include a reflective dark-field objective lens 128 configured to direct the illumination beam 116 to the sample 118 with a subset of angles within the NA and capture radiation from the sample 118 at remaining angles within the NA. By way of another example, the high-NA optical metrology tool 104 may be configured as a confocal imaging system. In this regard, the high-NA optical metrology tool 104 may include confocal pinholes in the illumination pathway 122 and the collection pathway 132 to limit the depth of field of an image. It is to be understood, however, that the above examples are provided solely for illustrative purposes and should not be interpreted as limiting.

Figure 2:
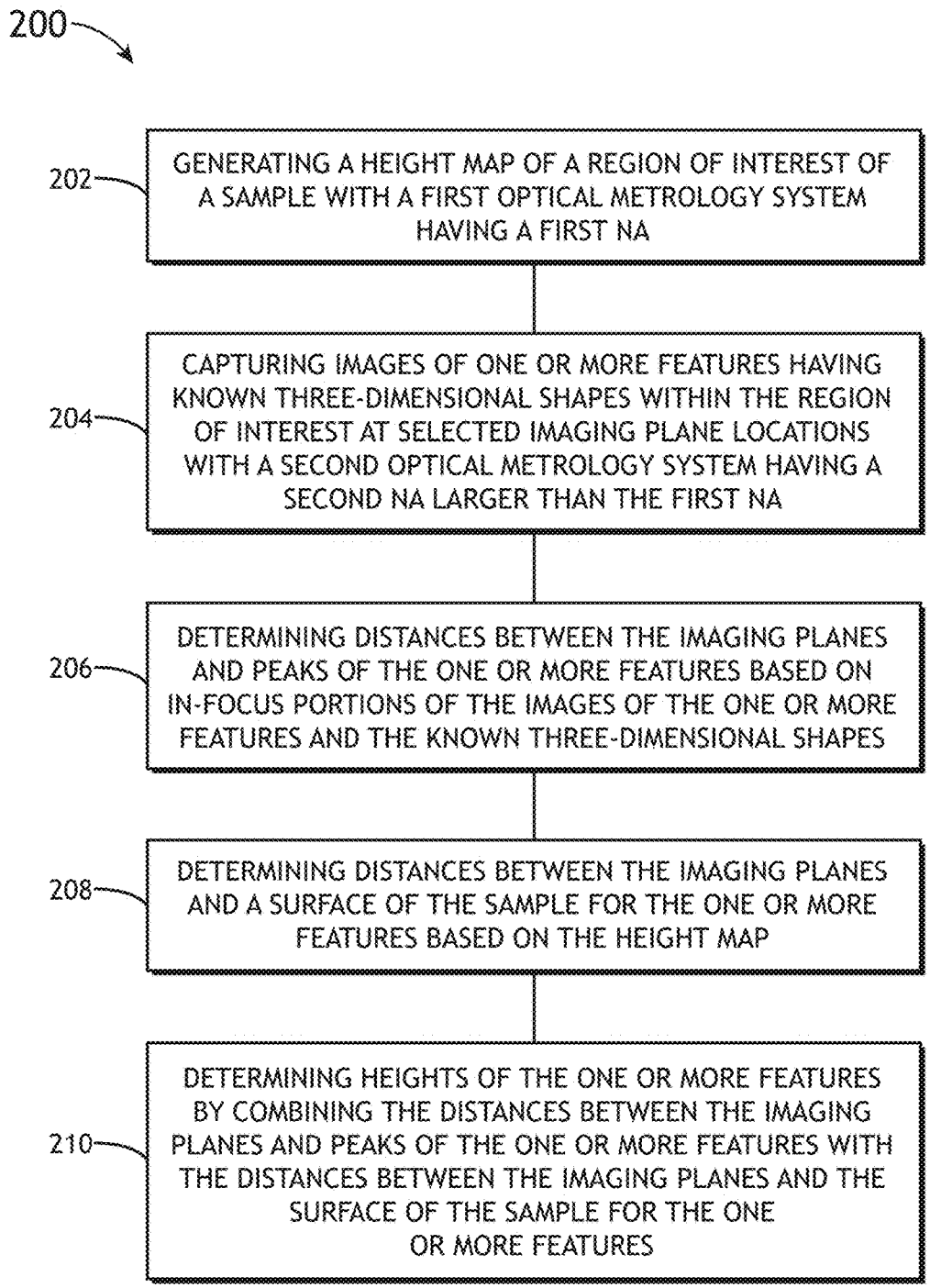
FIG. 2 is a flow diagram illustrating steps performed in a method for determining the height of features on a sample having known three-dimensional shapes, in accordance with one or more embodiments of the present disclosure.

FIG. 2 is a flow diagram illustrating steps performed in a method 200 for determining the height of features on a sample having known three-dimensional shapes, in accordance with one or more embodiments of the present disclosure. Applicant notes that the embodiments and enabling technologies described previously herein in the context of the surface height metrology system 100 should be interpreted to extend to method 200. It is further noted, however, that the method 200 is not limited to the architecture of the surface height metrology system 100.

In one embodiment, the method 200 includes a step 202 of generating a height map of a region of interest of a sample (e.g., sample 118, or the like) with a first optical metrology system having a first NA. The first optical metrology system may include, but is not required to include, the low-NA optical metrology tool 102 of the surface height metrology system 100.

The first NA may be selected to provide a high throughput measurement of the surface profile between the one or more features. For example, the height of the surface between the features may vary, but is not required to vary, slowly across the region of interest with respect to the heights of the features. Accordingly, the first NA may be selected to maximize the throughput while providing a selected measurement resolution (e.g., lateral and/or longitudinal resolution). Further, the step 202 may provide a surface map of the region of interest without regard to the accuracy of height measurements of the features having known three-dimensional shapes that are fabricated on the surface of the sample.

In another embodiment, the method 200 includes a step 204 of capturing images of one or more features having known three-dimensional shapes within the region of interest at selected imaging plane locations with a second optical metrology system having a second NA larger than the first NA. The second optical metrology system may include, but is not required to include, the high-NA optical metrology tool 104 of the surface height metrology system 100. Further, the locations of the imaging planes may correspond to the relative position of the sample with respect to the imaging plane of the second optical metrology system, which is typically fixed. For example, the locations of the imaging planes may be, but are not required to be, controlled by the chuck height (e.g., the position of a sample stage 120 along the optical axis of an objective of the second optical metrology system).

In one embodiment, the step 204 includes selecting the second NA such that the depth of field of the second optical metrology system is smaller than a height of at least one feature of the one or more features. In this regard, only a two-dimensional slice of a feature at the imaging plane may be in focus in an image generated in step 204.

In another embodiment, the step 204 may include capturing images of the features at a common chuck height. For example, it may be the case that the surface of the sample on which the features are fabricated is sufficiently flat that a portion of each of the fabricated features may be in focus at the common chuck height.

In another embodiment, the chuck height may be adjusted for each feature or group of features based on the height map generated in step 202. For example, it may be the case that the surface of the sample on which the features are fabricated varies such that a portion of each of the fabricated features is not in focus at a single chuck height. Accordingly, the chuck height may be adjusted for each feature based on the height of the surrounding surface provided by the height map of step 202.

In another embodiment, the method 200 includes a step 206 of determining distances between the imaging planes and peaks of the one or more features based on in-focus portions of the images of the one or more features and the known three-dimensional shapes. The step 206 may be performed by, but is not required to be performed by, one or more processors 108 of controller 106 associated with the surface height metrology system 100.

Provided that the three-dimensional shape of a feature is known, the distance between the imaging plane and the feature peak may be calculated based on the known geometry of the feature and geometric information of the in-focus portion of an image generated in step 204. For example, in-focus portions of an image generated in step 204 may correspond to two-dimensional slices of a feature at the location of the imaging plane. Thus, geometric information of the in-focus portion of the image such as, but not limited to, the size, shape, or orientation of the in-focus portion of the image may provide sufficient information to calculate the distance from the imaging plane to the peak of the feature given the known three-dimensional shape.

Further, the distance between the imaging plane and the feature peak may be calculated for any feature with a known three-dimensional shape. FIGS. 3A and 3B illustrate the relationship between an imaging plane and the feature peak for an exemplary feature including a spherical dome on a circular pillar. It is to be understood however, that FIGS. 3A and 3B, along with the associated descriptions, are provided solely for illustrative purposes and should not be interpreted as limiting. Features may have any three-dimensional shape in which a two-dimensional cross-section varies as a function of height for at least a portion of the feature. For example, features may include, but are not limited to, spherical domes, cones, pyramids, or irregular shapes. Features may additionally include pillars for a portion of the height.

FIG. 3A is a conceptual side view of a feature 302 including a spherical dome on a cylindrical pillar (e.g., a dome-capped pillar), in accordance with one or more embodiments of the present disclosure. In one embodiment, the feature 302 includes a spherical dome with a known dome radius 304 ($r_d$) on a pillar with pillar height 306 ($h_p$) such that the total feature height 308 ($h_{Tot}$) is the sum of the dome radius 304 and the pillar height 306. However, it may be the case that the pillar height may vary during production such that a measurement of the actual feature height is desired.

FIG. 3B is a cross-section 310 of the feature 302 at an imaging plane 312, in accordance with one or more embodiments of the present disclosure. For example, portions of the feature 302 within the depth of field 314 may be in focus in an image taken at the imaging plane 312.

In one embodiment, the in-focus portion of the cross-section 310 is a circle with cross-section radius 316 ($r_c$). In this regard, the thickness of the circle associated with cross-section 310 may be associated with the lateral extent of the feature 302 that are in focus in a given image.

The extent to which a slice of the feature 302 is in focus may depend on the transparency of the feature 302 to the imaging wavelengths (e.g., the wavelengths of the illumination beam 116). For example, as illustrated in FIG. 3B, only the perimeter of the cross-section 310 may be visible in an image of an opaque feature 302. By way of another example, though not shown, an entire cross-section 310 may be visible in an image of a transparent feature 302.

The distance 318 ($d$) between the imaging plane 312 and the peak of the feature 302 may thus be calculated based on the measured cross-section radius 316 and the known three-dimensional shape of the dome. For example, the distance 318 ($d$) between the imaging plane 312 and the peak of the feature 302 may be, but is not required to be, calculated as:

$$d = r_d - \sqrt{r_d^2 - r_c^2} \qquad (1)$$

It is to be understood that equation (1) provided for a spherical dome (e.g., the dome-capped pillar illustrated in FIGS. 3A and 3B) is provided solely for illustrative purposes and should not be interpreted as limiting. Corresponding equations relating the distance between an imaging plane (e.g., an imaging plane of the high-NA optical metrology tool 104, or the like) and the peak of the feature 302 to geometric parameters of in-focus portions of an image at the imaging plane may be generated for a feature including any known three-dimensional shape such as, but not limited to, domes, cones, pillars, or arbitrary shapes.

In another embodiment, step 206 includes generating fitting curves for the images by fitting the in-focus portions of the images to two-dimensional slices of the known three-dimensional shapes of the one or more features 302. Thus, the distances between the imaging planes 312 and peaks of the one or more features 302 may be determined based on geometric parameters of the fitting curves (e.g., size, shape, orientation, or the like) and the known three-dimensional shapes.

For example, in the example of the feature 302, a two-dimensional slice of a spherical dome is a circle. Thus, step 206 may include fitting the in-focus portion of an image of the feature 302 at the imaging plane 312 (e.g., generated in step 204) to a circle with the cross-section radius 316 of the circle as a fitting parameter. In this regard, the fitted cross-section radius 316 may be used to calculate the distance 318 between the imaging plane 312 and the peak of the feature 302.

The fitting curves for in-focus portions of the images generated in step 204 may be generated using any method known in the art. For example, a shape-based feature extraction technique such as, but not limited to, a Hough transform technique or a template matching technique, may be applied to identify an expected two-dimensional slice of the known three-dimensional shape in an image generated in step 204. Relevant geometric features of the identified two-dimensional slice may then be used to determine the distance from the imaging plane to the peak of a feature (e.g., distance 318 in FIG. 3).

In one embodiment, the in-focus portions of the images generated in step 204 are isolated at least in part prior to generating the fitting curves. For example, step 204 may include generating a processed image in which the in-focus portions of the images generated in step 204 are isolated. In this regard, out-of-focus portions of the images generated in step 204 may be removed, which may facilitate accurate fitting of the in-focus portion to the expected two-dimensional slice of the known three-dimensional shape of a feature.

The in-focus portions of an image generated in step 204 may be isolated by any method known in the art. For example, the in-focus portions of an image generated in step 204 may be isolated based on image properties such as, but not limited to, intensity (e.g., pixel values), contrast, or gradients.

Figure 4:
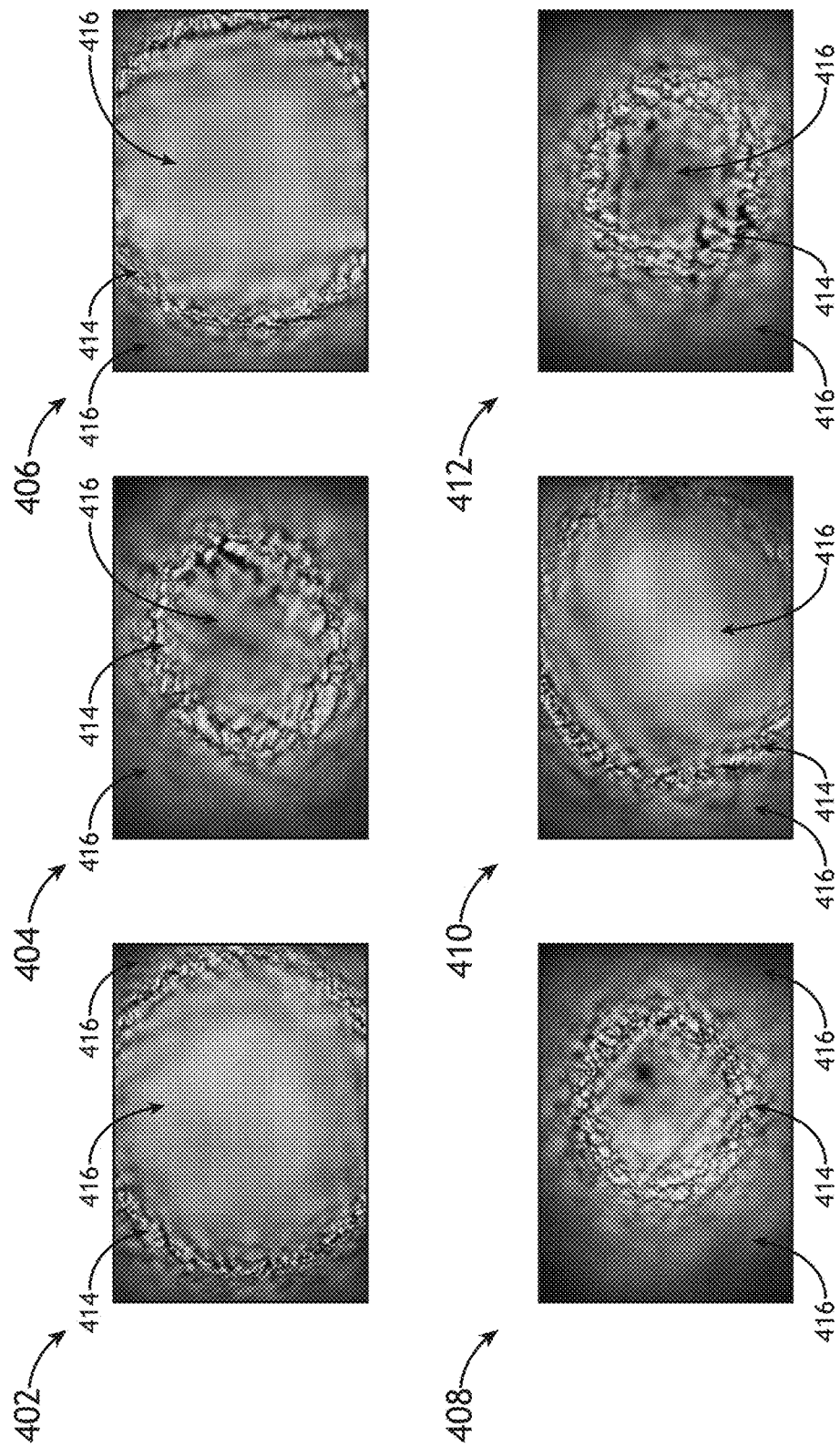
FIG. 4 includes images of features illustrated in FIGS. 3A and 3B at various imaging planes captured with a 35× objective lens with a NA of 0.875 and a depth of field smaller than the feature height, in accordance with one or more embodiments of the present disclosure.

FIG. 4 includes images 402-412 of features illustrated in FIGS. 3A and 3B at various imaging planes captured with a 35× objective lens with a NA of 0.875 and a depth of field smaller than the feature height 308, in accordance with one or more embodiments of the present disclosure. In the images 402-412, surface roughness on the features gives rise to intensity variations. As illustrated in images 402-412, in-focus portions 414 of the images tend to exhibit greater contrast (e.g., a greater difference between high and low pixel values) than out-of-focus portions 416 such that the intensity values and/or the contrast may be used to isolate the in-focus portions of the image. For example, the in-focus portions 414 tend to have both higher-intensity values (e.g., whiter pixels in images 402-412) and lower-intensity values (e.g., blacker pixels in images 402-412) than out-of-focus portions 416. Further, the in-focus portions 414 tend to exhibit sharper gradients than out of focus portions such that pixel value gradients may be used to isolate the in-focus portions of the image.

By way of another example, the in-focus portions 414 of an image generated in step 204 may be isolated using one or more image-processing steps such as, but not limited to, filtering steps (e.g., Gaussian blurring, speckle-reduction filtering, or the like), morphological image processing (e.g., image opening, image closing, image erosion, image dilation, or the like), thresholding, or binarization.

Figure 5:
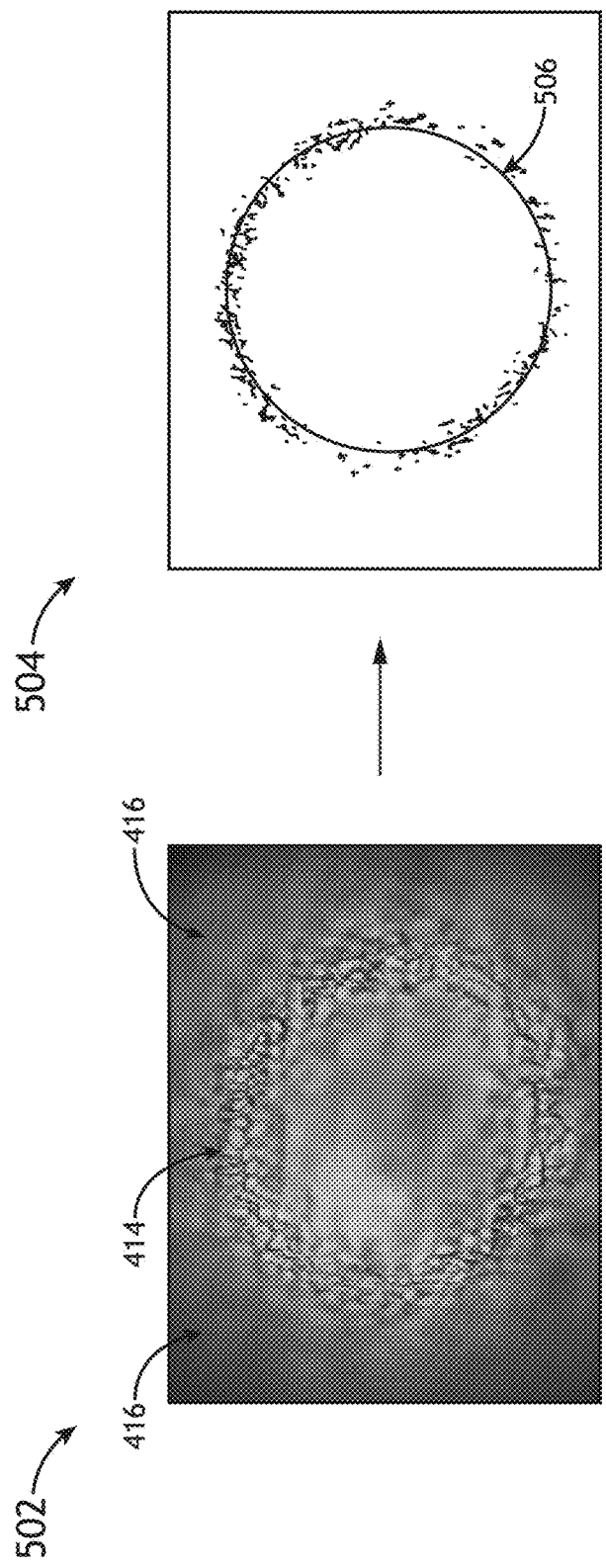
FIG. 5 includes a captured image of a feature illustrated in FIGS. 3A and 3B captured by a 35× objective lens with a NA of 0.875 and a depth of field smaller than a feature height, along with a processed image in which the in-focus portion is isolated, in accordance with one or more embodiments of the present disclosure.

FIG. 5 includes a captured image 502 of the feature 302 illustrated in FIGS. 3A and 3B captured by a 35× objective lens with a NA of 0.875 and a depth of field smaller than the feature height 308, along with a processed image 504 in which the in-focus portion 414 is isolated, in accordance with one or more embodiments of the present disclosure. For example, the captured image 502 may be generated in step 204 (e.g., by the high-NA optical metrology tool 104 of the surface height metrology system 100, or the like). In one embodiment, the processed image 504 is a binary image including only pixels from the in-focus portion 414 of the captured image 502. For example, the binary processed image 504 may be generated based on an intensity (e.g., pixel value) threshold selected to capture pixels within the in-focus portion 414 of the captured image 502.

In another embodiment, the pixels of the binary processed image 504 are fit to a circle (fitting curve 506), which is the shape of the two-dimensional slice of the feature 302 illustrated in FIGS. 3A and 3B. The radius of the fitted circle (e.g., cross-section radius 316) may thus be used to calculate the distance between the imaging plane used to generate the captured image 502 and the peak of the feature (e.g., distance 318 in FIGS. 3A and 3B).

In another embodiment, the method 200 includes a step 208 of determining distances between the imaging planes and a surface of the sample for the one or more features based on the height map. The step 208 may be performed by, but is not required to be performed by, one or more processors 108 of controller 106 associated with the surface height metrology system 100. For example, referring again to FIGS. 3A and 3B, step 208 may include determining the distance 320 between the imaging plane 312 and the surface 322 of the sample.

The height map generated in step 202 may contain the surface height variations across the region of interest. Further, the chuck heights of the sample at each measurement location from step 202 are known. Thus, the distances between the imaging planes (e.g., imaging plane 312) and the surface of the sample (e.g., sample 118) for the features within the region of interest may be precisely determined based on known information such as, but not limited to, the chuck heights of the sample at each measurement location from step 202, the measured surface height variations in the height map, the known chuck heights associated with images captured in step 204 and any offsets between imaging planes of the first optical metrology system and the second optical metrology system (e.g., the low-NA optical metrology tool 102 and the high-NA optical metrology tool 104).

In the case where the first optical metrology system and the second optical metrology system are configurations of a common parfocal optical system, the offsets between the associated imaging planes may be negligible.

Further, it may be the case that the surface of the sample varies in the region surrounding a fabricated feature. For example, the surface height may be different on different sides of a fabricated feature. In this case, a surface height value at the location of the peak (e.g., determined based on images from step 204 and/or calculations of step 206) may be generated by extrapolating the values of the height map at locations surrounding the feature to the location of the peak. This extrapolated height map value may then be used to determine the distance between the imaging plane and the surface of the sample in step 208.

In another embodiment, the method 200 includes a step 210 of determining heights of the one or more features by combining the distances between the imaging planes and peaks of the one or more features with the distances between the imaging planes and the surface of the sample for the one or more features. The step 210 may be performed by, but is not required to be performed by, one or more processors 108 of controller 106 associated with the surface height metrology system 100.

In one embodiment, step 210 includes determining the height of a feature by adding the distance between the imaging plane and the feature peak (e.g., distance 318 in FIG. 3B) generated in step 206 and the distance between the imaging plane and the surface of the sample (e.g., distance 320 of FIG. 3B). Further, portions of the fabricated features, including the peaks, may protrude above the surface of the sample or dip below the surface of the sample. Accordingly, the feature height determined in step 210 may account for the relationship between the feature and the surface. For example, distances above the sample surface may be provided as positive numbers and distances below the sample surface may be provided as negative numbers, or vice versa.

In another embodiment, the method 200 further includes a step of adjusting one or more process tools (e.g., lithography tools, etching tools, or the like) for the fabrication of a subsequent layer on the sample to compensate for the measured heights of the one or more features. For example, a subsequent layer may interface with the one or more features. Accordingly, one or process tools may be adjusted to provide that the subsequent layer properly conforms to the height of the fabricated features.

FIGS. 6 through 8B illustrate an exemplary measurement of the heights of 48 features including dome-capped pillars as illustrated in FIGS. 3A and 3B using the method 200 described above.

Figure 6:
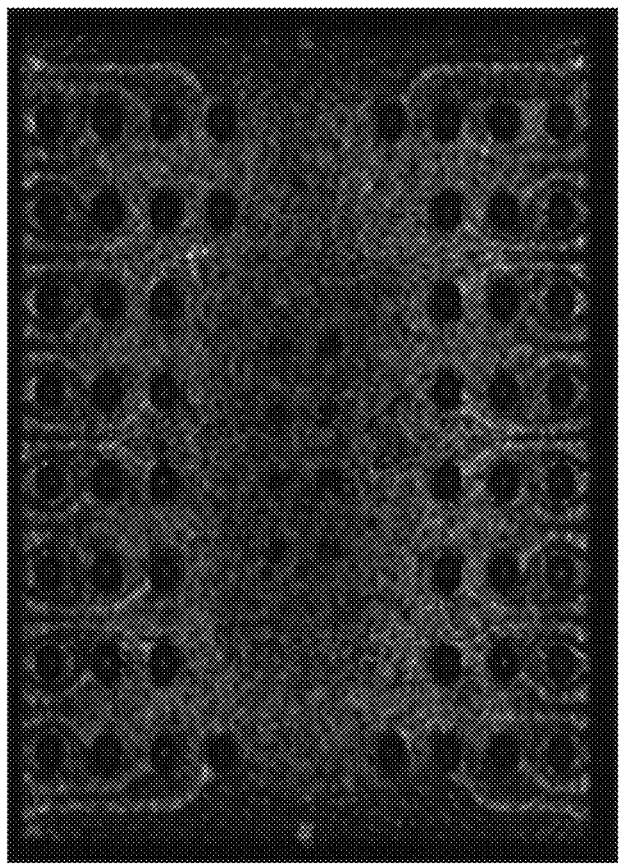
FIG. 6 is an image of a region of interest of a sample including dome-capped pillars, in accordance with one or more embodiments of the present disclosure.
Figure 7:
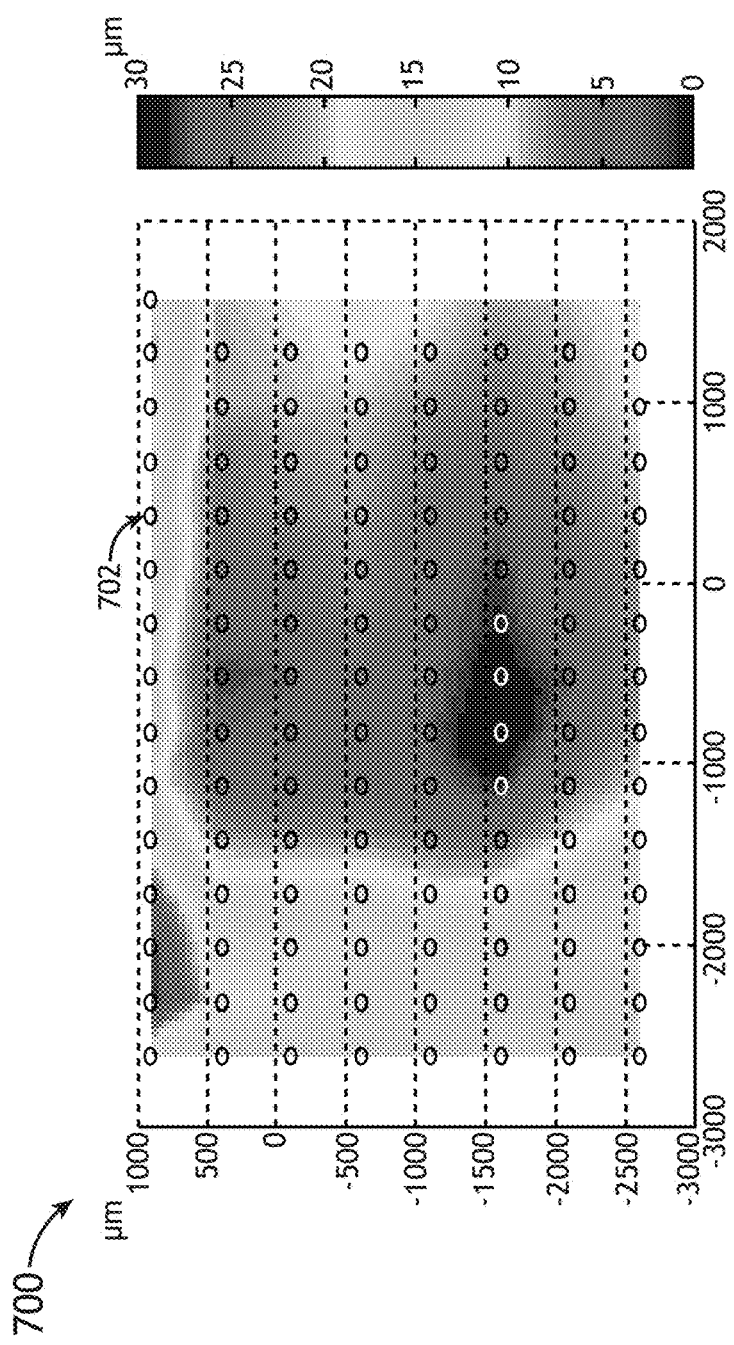
FIG. 7 is a plot representing a height map of the region of interest of FIG. 6, in accordance with one or more embodiments of the present disclosure.
Figure 8A:
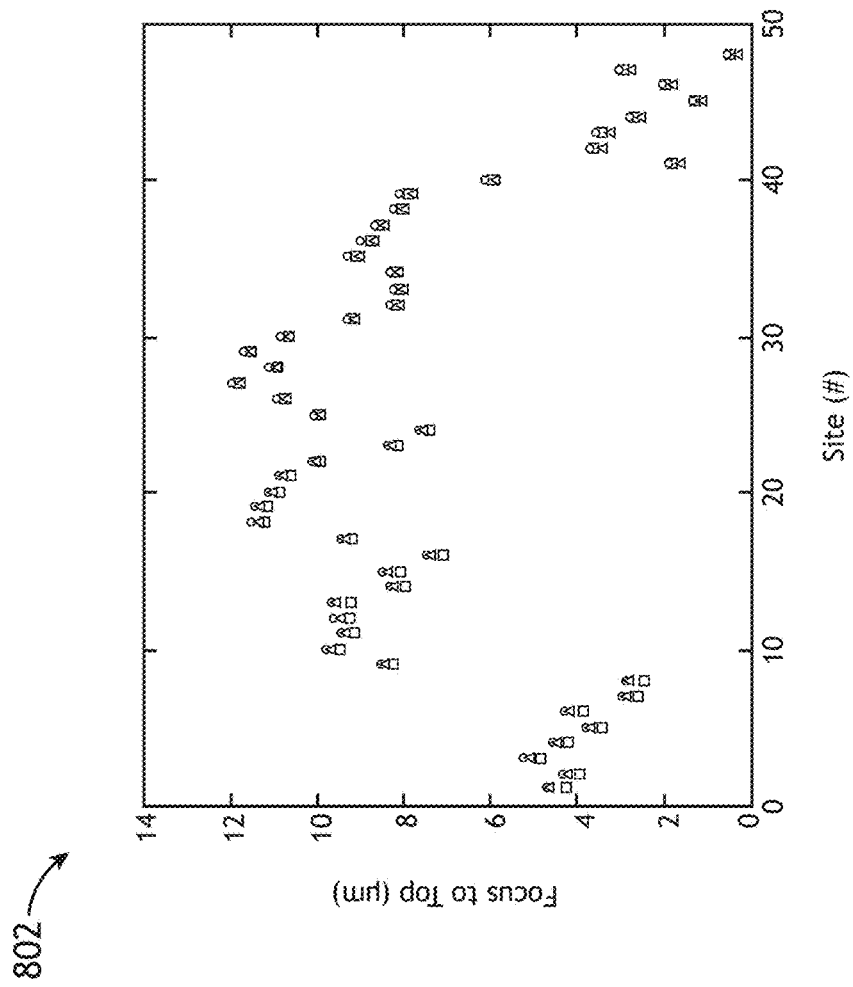
FIG. 8A is a plot of the calculated distances between image planes of high NA images and the peaks of the features for three separate trials, in accordance with one or more embodiments of the present disclosure.
Figure 8B:
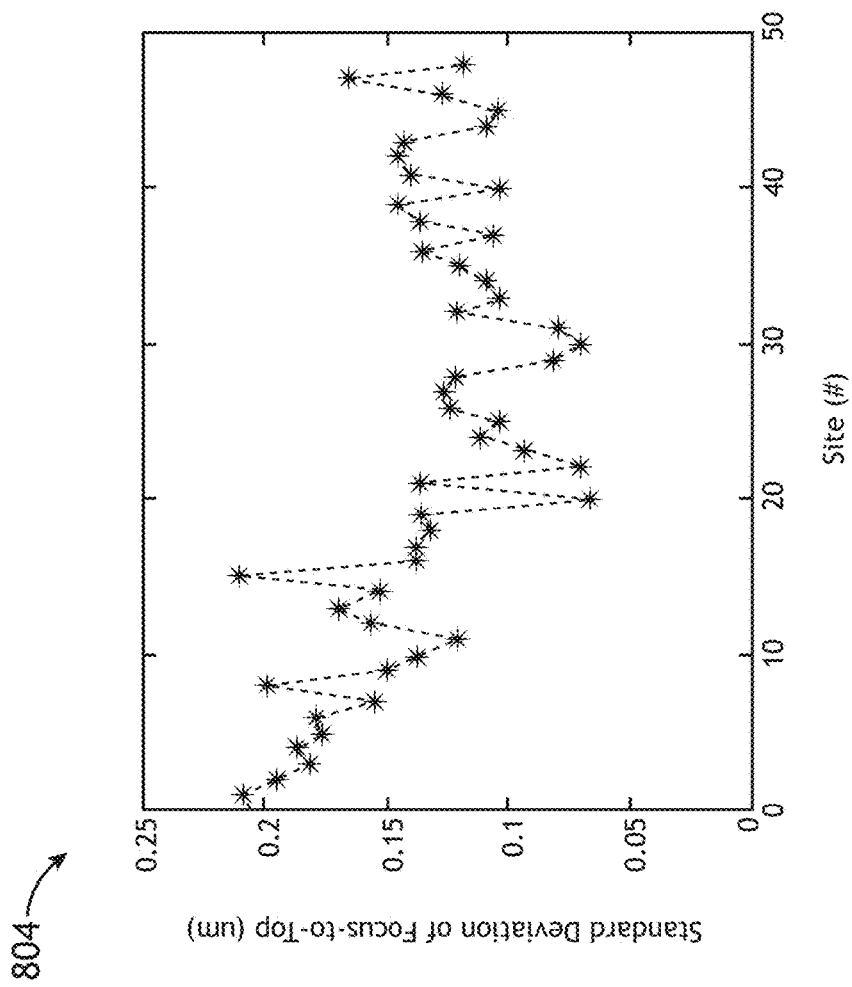
FIG. 8B is a plot of the standard deviations between the values in plot for each of the features, in accordance with one or more embodiments of the present disclosure.

FIG. 6 is an image 600 of a region of interest of a sample including dome-capped pillars, in accordance with one or more embodiments of the present disclosure. FIG. 7 is a plot 700 representing a height map of the region of interest of FIG. 6, in accordance with one or more embodiments of the present disclosure. For example, the plot 700 may be generated in step 202. In one embodiment, as illustrated in FIG. 7, the sampling grid 702 (e.g., locations at which height measurements are generated) includes a series of sampling locations periodically distributed across the sample. In another embodiment, the sampling grid 702 is selected to only include portions of the sample having features with known three-dimensional shapes to be measured. FIG. 8A is a plot 802 of the calculated distances between image planes of high NA images and the peaks of the features (e.g., distance 318 in FIG. 3B) for three separate trials, in accordance with one or more embodiments of the present disclosure. For example, the plot 802 may be generated by three iterations of step 204 and step 206 for each of the features. FIG. 8B is a plot 804 of the standard deviations between the values in plot 802 for each of the features, in accordance with one or more embodiments of the present disclosure. As illustrated in FIGS. 8A and 8B, the calculation of the distances between image planes of high NA images and the peaks of the features (e.g., distance 318 in FIG. 3B) based on high NA images and known three-dimensional geometric shapes of the features may provide highly repeatable measurements.

It is to be understood that the examples provided in FIGS. 3 through 8B and the associated descriptions are provided solely for illustrative purposes and should not be interpreted as limiting. For example, FIGS. 3A through 8B illustrate the application of steps of method 200 on features including dome-capped pillars. However, the steps of method 200 may be applied to features with arbitrary shapes such as, but not limited to, cones or pyramids alone or on pillars.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, comprising:
a controller including one or more processors configured to execute program instructions configured to cause the one or more processors to:
generate a height map of a region of interest of a sample with a first optical metrology system having a first numerical aperture;
receive an image of a feature within the region of interest at a selected imaging plane location from a second optical metrology system having a second numerical aperture larger than the first numerical aperture, wherein a depth of field of the second optical metrology system is smaller than a height of the feature, wherein the feature has a known three-dimensional shape;
calculate a distance between the selected imaging plane location and a peak of the feature based on in-focus portions of the image of the feature and the known three-dimensional shape of the feature;
determine a distance between the selected imaging plane location and a surface of the sample for the feature based on the height map; and
determine the height of the feature by combining the distance between the selected imaging plane location and the peak of the feature with the distance between the selected imaging plane location and the surface of the sample for the feature.

2. The system of claim 1, wherein the first optical metrology system and the second optical metrology system are configurations of a common optical metrology system, wherein the first optical metrology system includes the common optical metrology system with a first objective lens having a first depth of field, wherein the second optical metrology system includes the common optical metrology system with a second objective lens having a second depth of field, wherein the depth of field of the second optical metrology system is the second depth of field.

3. The system of claim 2, wherein the common optical metrology system comprises:
a parfocal system, wherein the first objective lens and the second objective lens are interchangeable.

4. The system of claim 1, wherein the first optical metrology system is different than the second optical metrology system.

5. The system of claim 1, wherein determining the distance between the selected imaging plane location and the peak of the feature comprises:

generating one or more fitting curves for the image by fitting the in-focus portions of the image to two-dimensional slices of the known three-dimensional shape of the feature; and determining the distance between the selected imaging plane and the peak of the feature based on dimensions of the one or more fitting curves and the known three-dimensional shape.

6. The system of claim 5, wherein generating the one or more fitting curves for the image comprises:
performing a shape-based feature extraction technique to generate the one or more fitting curves based on the two-dimensional slices of the known three-dimensional shapes.

7. The system of claim 6, wherein the shape-based feature extraction technique comprises:
a Hough transform.

8. The system of claim 5, wherein generating the one or more fitting curves for the image comprises:
isolating the in-focus portions of the images; and
fitting the isolated in-focus portions of the images to the two-dimensional slices of the known three-dimensional shapes of the one or more features.

9. The system of claim 8, wherein isolating the in-focus portions of the image comprises:
isolating the in-focus portions of the image based on at least one of intensity, contrast, or gradient data of the image.

10. The system of claim 8, wherein isolating the in-focus portions of the image comprises:
isolating the in-focus portions of the image using one or more image-processing steps.

11. The system of claim 10, wherein the one or more image-processing steps comprises:
at least one of binarization or one or more morphological image processing steps.

12. The system of claim 1, wherein the peak of feature is higher than the surface of the sample.

13. The system of claim 1, wherein the peak of the feature is lower than the surface of the sample.

14. The system of claim 1, wherein the feature comprises:
a known three-dimensional shape including at least one of a spherical dome, a cone, or a pyramid.

15. The system of claim 1, wherein the feature comprises:
a known three-dimensional shape including a pillar and at least one of a spherical dome, a cone, or a pyramid.

16. The system of claim 1, wherein the image of the feature within the region of interest at selected image plane locations comprise:
at least one of a brightfield or a darkfield image.

17. A system, comprising:
a first optical metrology system configured to generate a height map of a region of interest of a sample including one or more features having known three-dimensional shapes, wherein the first optical metrology system has a first numerical aperture and a first depth of field;
a second optical metrology system configured to generate images of the one or more features at selected imaging plane locations, wherein the second optical metrology system has a second numerical aperture larger than the first numerical aperture and a second depth of field, wherein the second depth of field is smaller than a height of at least one feature of the one or more features; and
a controller communicatively coupled to the first optical metrology system and the second optical metrology system, the controller including one or more processors configured to execute program instructions configured to cause the one or more processors to:
calculate distances between the selected imaging planes and one or more peaks of the one or more features based on in-focus portions of the images of the one or more features and the known three-dimensional shapes of the one or more features;
determine distances between the selected imaging plane locations and a surface of the sample for the one or more features based on the height map; and
determine heights of the one or more features by combining the distances between the selected imaging plane locations and the one or more peaks of the one or more features with the distances between the selected imaging plane locations and the surface of the sample for the one or more features.

18. The system of claim 17, wherein the first optical metrology system and the second optical metrology system are configurations of a common optical metrology system, wherein the first optical metrology system includes the common optical metrology system with a first objective lens having the first depth of field, wherein the second optical metrology system includes the common optical metrology system with a second objective lens having the second depth of field.

19. The system of claim 18, wherein the common optical metrology system comprises:
a parfocal system, wherein the first objective lens and the second objective lens are interchangeable.

20. The system of claim 17, wherein the first optical metrology system is different than the second optical metrology system.

21. The system of claim 17, wherein determining the distances between the selected imaging plane locations and the one or more peaks of the one or more features comprises:
generating one or more fitting curves for the images by fitting the in-focus portions of the images to two-dimensional slices of the known three-dimensional shapes of the one or more features; and
determining the distances between the selected imaging planes and the one or more peaks of the one or more features based on dimensions of the one or more fitting curves and the known three-dimensional shapes.

22. The system of claim 21, wherein generating the one or more fitting curves for the images comprises:
performing a shape-based feature extraction technique to generate the one or more fitting curves based on the two-dimensional slices of the known three-dimensional shapes.

23. The system of claim 22, wherein the shape-based feature extraction technique comprises:
a Hough transform.

24. The system of claim 21, wherein generating the one or more fitting curves for the images comprises:
isolating the in-focus portions of the images; and
fitting the isolated in-focus portions of the images to the two-dimensional slices of the known three-dimensional shapes of the one or more features.

25. The system of claim 24, wherein isolating the in-focus portions of the images comprises:
isolating the in-focus portions of the images based on at least one of intensity, contrast, or gradient data of the one or more images.

26. The system of claim 24, wherein isolating the in-focus portions of the images comprises:
isolating the in-focus portions of the images using one or more image-processing steps.

27. The system of claim 26, wherein the one or more image-processing steps comprises:
at least one of binarization or one or more morphological image processing steps.

28. The system of claim 17, wherein a peak of at least one feature of the one or more features is higher than the surface of the sample.

29. The system of claim 17, wherein a peak of at least one feature of the one or more features is lower than the surface of the sample.

30. The system of claim 17, wherein at least one feature of the one or more features comprises:
a known three-dimensional shape including at least one of a spherical dome, a cone, or a pyramid.

31. The system of claim 17, wherein at least one feature of the one or more features comprises:
a known three-dimensional shape including a pillar and at least one of a spherical dome, a cone, or a pyramid.

32. The system of claim 17, wherein the second optical metrology tool comprises:
at least one of brightfield metrology tool or a darkfield metrology tool.

33. The system of claim 17, wherein the second optical metrology tool comprises:
a confocal metrology tool.

34. The system of claim 17, wherein the first optical metrology tool comprises:
an interferometric metrology tool.

35. A method, comprising:
generating a height map of a region of interest of a sample with a first optical metrology system having a first numerical aperture;
capturing an image of a feature within the region of interest at a selected imaging plane location with a second optical metrology system having a second numerical aperture larger than the first numerical aperture, wherein a depth of field of the second optical metrology system is smaller than a height of the feature, wherein the feature has a known three-dimensional shape;
calculating, with one or more processors, a distance between the selected imaging plane location and a peak of the feature based on in-focus portions of the image of the feature and the known three-dimensional shape of the feature;
determining, with the one or more processors, a distance between the selected imaging plane location and a surface of the sample for the feature based on the height map; and
determining, with the one or more processors, the height of the feature by combining the distance between the selected imaging plane location and the peak of the feature with the distance between the selected imaging plane location and the surface of the sample for the feature.

36. The method of claim 35, further comprising:
adjusting at least one process tool for fabricating a subsequent layer to compensate for the height of the feature.

37. The system of claim 1, wherein the one or more processors are further configured to execute program instructions causing the one or more processors to:
receive one or more additional images of one or more additional features within the region of interest at one or more additional selected imaging plane locations from the second optical metrology system, wherein the depth of field of the second optical metrology system is smaller than a height of at least one feature of the one or more additional features, wherein the one or more additional features have known three-dimensional shapes;
calculate distances between the one or more additional selected imaging plane locations and one or more peaks of the one or more additional features based on in-focus portions of the one or more additional images of the one or more additional features and the known three-dimensional shapes of the one or more additional features;
determine distances between the one or more additional selected imaging plane locations and a surface of the sample for the one or more additional features based on the height map; and
determine heights of the one or more additional features by combining the distances between the one or more additional selected imaging plane locations and the one or more peaks of the one or more additional features with the distances between the one or more additional selected imaging plane locations and the surface of the sample for the one or more additional features.

38. The system of claim 37, wherein at least one of the one or more additional selected imaging plane locations is equivalent to the selected imaging plane location.

39. The method of claim 35, further comprising:
capturing one or more additional images of one or more additional features within the region of interest at one or more additional selected imaging plane locations with the second optical metrology system having the second numerical aperture larger than the first numerical aperture, wherein the depth of field of the second optical metrology system is smaller than a height of at least one feature of the one or more additional features, wherein the one or more additional features have known three-dimensional shapes;
calculating, with one or more processors, distances between the one or more additional selected imaging plane locations and one or more peaks of the one or more additional features based on in-focus portions of the one or more additional images of the one or more additional features and the known three-dimensional shapes of the one or more features;
determining, with one or more processors, distances between the one or more additional selected imaging plane locations and a surface of the sample for the one or more additional features based on the height map; and
determining, with one or more processors, heights of the one or more additional features by combining the distances between the one or more additional selected imaging plane locations and the one or more peaks of the one or more additional features with the distances between the one or more additional selected imaging plane locations and the surface of the sample for the one or more additional features.

* * * * *